(12) United States Patent
Dvorak et al.

(10) Patent No.: US 10,442,020 B2
(45) Date of Patent: Oct. 15, 2019

(54) SAW BLADE FOR OSCILLATING TOOL OR HANDHELD TOOL

(71) Applicants: Robert Bosch Tool Corporation, Broadview, IL (US); Robert Bosch GmbH, Stuttgart (DE)

(72) Inventors: Christopher Ryan Dvorak, Ottowa, KS (US); Noel Francis, Skokie, IL (US); Jeremy Rubens, Palatine, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 152 days.

(21) Appl. No.: 14/983,124

(22) Filed: Dec. 29, 2015

(65) Prior Publication Data

US 2017/0182570 A1   Jun. 29, 2017

(51) Int. Cl.
  *B26D 7/26* (2006.01)
  *B23D 61/00* (2006.01)
  *B23D 51/00* (2006.01)
  *B27B 19/00* (2006.01)

(52) U.S. Cl.
  CPC ........... *B23D 61/006* (2013.01); *B23D 51/00* (2013.01); *B27B 19/006* (2013.01)

(58) Field of Classification Search
  CPC .... B23D 61/006; B23D 51/00; B27B 19/006; B23B 2231/04; Y10T 403/32327; Y10T 403/32344; Y10T 403/32361
  USPC ...................................................... 83/698.11
  See application file for complete search history.

(56) References Cited

U.S. PATENT DOCUMENTS

| 3,706,474 | A | * | 12/1972 | Neuenburg | ........ B23D 57/0076 173/110 |
| 5,468,247 | A | * | 11/1995 | Matthai | .................... A61F 15/02 30/339 |
| 5,735,866 | A | * | 4/1998 | Adams | ................. B23D 61/006 30/339 |
| 7,001,403 | B2 | * | 2/2006 | Hausmann | ........... A61B 17/142 125/15 |
| 7,527,628 | B2 | * | 5/2009 | Fletcher | ................. B23D 51/10 606/177 |
| D697,776 | S | * | 1/2014 | Bozic | .............................. D8/70 |

(Continued)

FOREIGN PATENT DOCUMENTS

DE   102012204864 A1 *  6/2013  ........... B23D 61/006

*Primary Examiner* — Ghassem Alie
*Assistant Examiner* — Bharat C Patel
(74) *Attorney, Agent, or Firm* — Maginot Moore & Beck LLP

(57) ABSTRACT

An accessory for a power tool includes a blade and a coupling. The coupling includes a blade portion, a tool portion, and a transition. The blade portion is fixedly coupled to the blade. The tool portion is configured to be removably coupled to the power tool. The tool portion also includes an opening. The transition extends between the blade portion and the tool portion, and the transition includes a first transition region, where the transition intersects with the blade portion, and a second transition region, where the transition intersects with the tool portion. The first transition region includes a first arc having a center that is arranged between the first arc and the opening, and the second transition region includes a second arc having a center that is arranged between the second arc and the opening.

20 Claims, 6 Drawing Sheets

(56) References Cited

U.S. PATENT DOCUMENTS

| | | | | |
|---|---|---|---|---|
| D697,777 S | * | 1/2014 | Bozic | D8/70 |
| 9,522,432 B2 | * | 12/2016 | Staub | B24B 23/04 |
| 2001/0041524 A1 | * | 11/2001 | Steiger | B23D 61/006 |
| | | | | 451/356 |
| 2002/0104421 A1 | * | 8/2002 | Wurst | B23D 61/006 |
| | | | | 83/835 |
| 2009/0013540 A1 | * | 1/2009 | Bohne | B23D 61/006 |
| | | | | 30/388 |
| 2011/0266758 A1 | * | 11/2011 | Sergyeyenko | B24B 23/04 |
| | | | | 279/106 |
| 2011/0266759 A1 | * | 11/2011 | Goldman | B24B 23/04 |
| | | | | 279/106 |
| 2012/0144676 A1 | * | 6/2012 | Davidian | B25F 3/00 |
| | | | | 30/142 |
| 2012/0311876 A1 | * | 12/2012 | Zhang | B23D 61/006 |
| | | | | 30/347 |

* cited by examiner

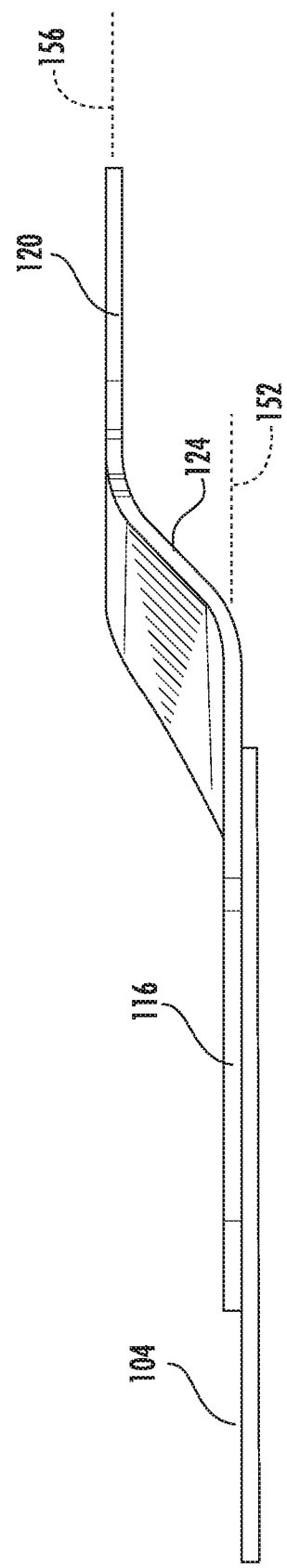

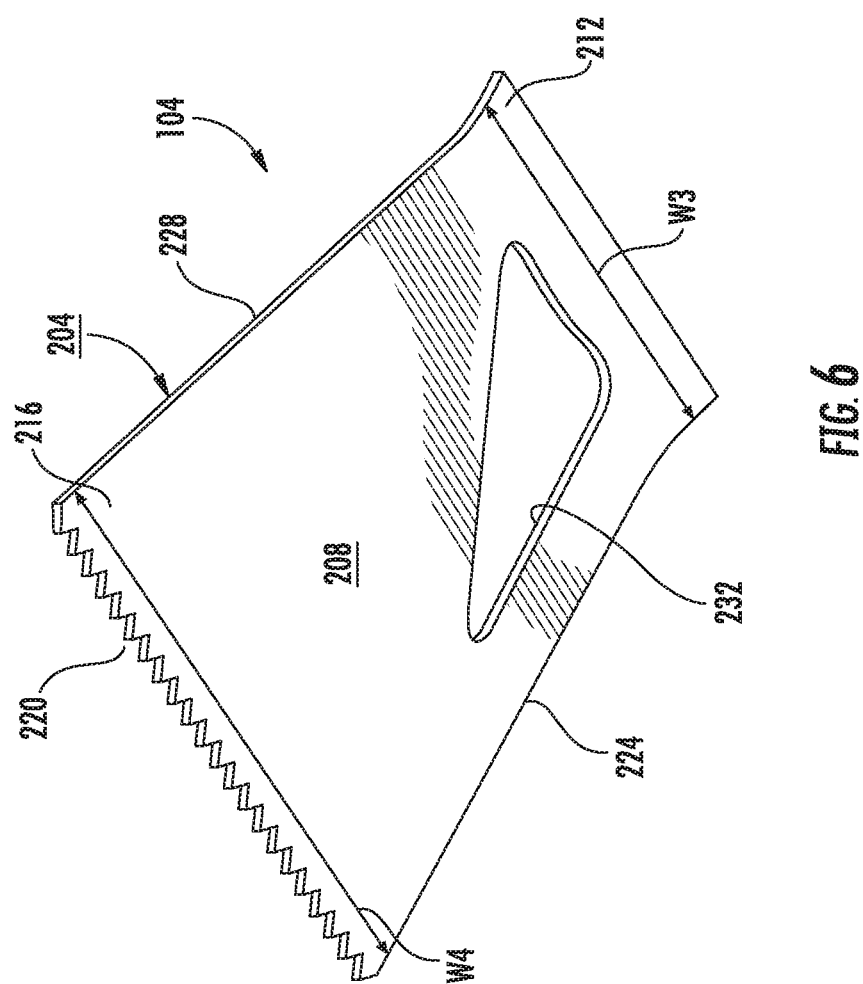

SAW BLADE FOR OSCILLATING TOOL OR HANDHELD TOOL

TECHNICAL FIELD

This disclosure relates to the field of saw blades for power tools, and more particularly to saw blades for oscillating or handheld power tools.

BACKGROUND

Oscillating power tools are typically lightweight, handheld tools configured to oscillate various accessories and attachments, such as cutting blades, sanding discs, grinding tools, and many others. The accessory tools enable the oscillating power tool to be used to shape and contour workpieces in a wide variety of ways, such as, for example, cutting woods and metals and polishing and grinding stone and masonry. One issue with accessories for oscillating or handheld tools, however, is making accessories that are easily interchangeable while also strong and sturdy. Another issue with accessories for oscillating or handheld tools is making accessories that are strong and sturdy while also lightweight and compact.

As shown in FIG. 1, a typical saw blade accessory 10 for an oscillating power tool 14 includes a blade 18 and a coupling 22. The blade 18 is fixedly coupled to the coupling 22, and the coupling 22 is removably coupled to the oscillating power tool 14. During a cutting operation, the oscillating power tool 14 drives the blade 18, via the coupling 22, to make a cut. During use of the power tool 14, it is important that the blade 18 remain fixed in place relative to the coupling 22 to improve the quality of the cut made by the blade 18. Accordingly, the blade 18 and the coupling 22 are typically affixed by welding or another method of affixation along a contact area 26 where the blade 18 is in contact with the coupling 22. A larger contact area 26 provides a stronger and sturdier connection between the blade 18 and the coupling 22. However, a larger contact area 26 also requires more surface area, and thus more material, of each of the blade 18 and the coupling 22. Thus, it is desirable to retain a strong and sturdy connection between the blade 18 and the coupling 22, but also to reduce the amount of material of the blade 18 and coupling 22 to make the accessory 10 more lightweight and compact.

In order to accommodate the oscillating power tool 14 during a cutting operation, the accessory 10 includes a bend 30, which offsets the blade 18 from the oscillating power tool 14 such that the blade 18 contacts a workpiece 34 but the oscillating power tool 14 does not. The bend 30, however, can introduce bending and flexing of the blade 18 and coupling 22. Thus it is desirable to retain the bend 30 in the accessory 10, but to minimize the bending and flexing of the blade 18 and coupling 22 to improve the quality of the cut made in the workpiece 34.

SUMMARY

In accordance with one embodiment of the present disclosure, an accessory for a power tool includes a blade and a coupling. The coupling includes a blade portion, a tool portion, and a transition. The blade portion is fixedly coupled to the blade. The tool portion is configured to be removably coupled to the power tool. The tool portion also includes an opening. The transition extends between the blade portion and the tool portion, and the transition includes a first transition region, where the transition intersects with the blade portion, and a second transition region, where the transition intersects with the tool portion. The first transition region includes a first arc having a center that is arranged between the first arc and the opening, and the second transition region includes a second arc having a center that is arranged between the second arc and the opening.

BRIEF DESCRIPTION OF THE DRAWINGS

FIG. 5 is a side plan view of the saw blade accessory of FIG. 2.

FIG. 6 is a top perspective view of a blade of the saw blade accessory of FIG. 2 in isolation.

DETAILED DESCRIPTION

Figure 1:
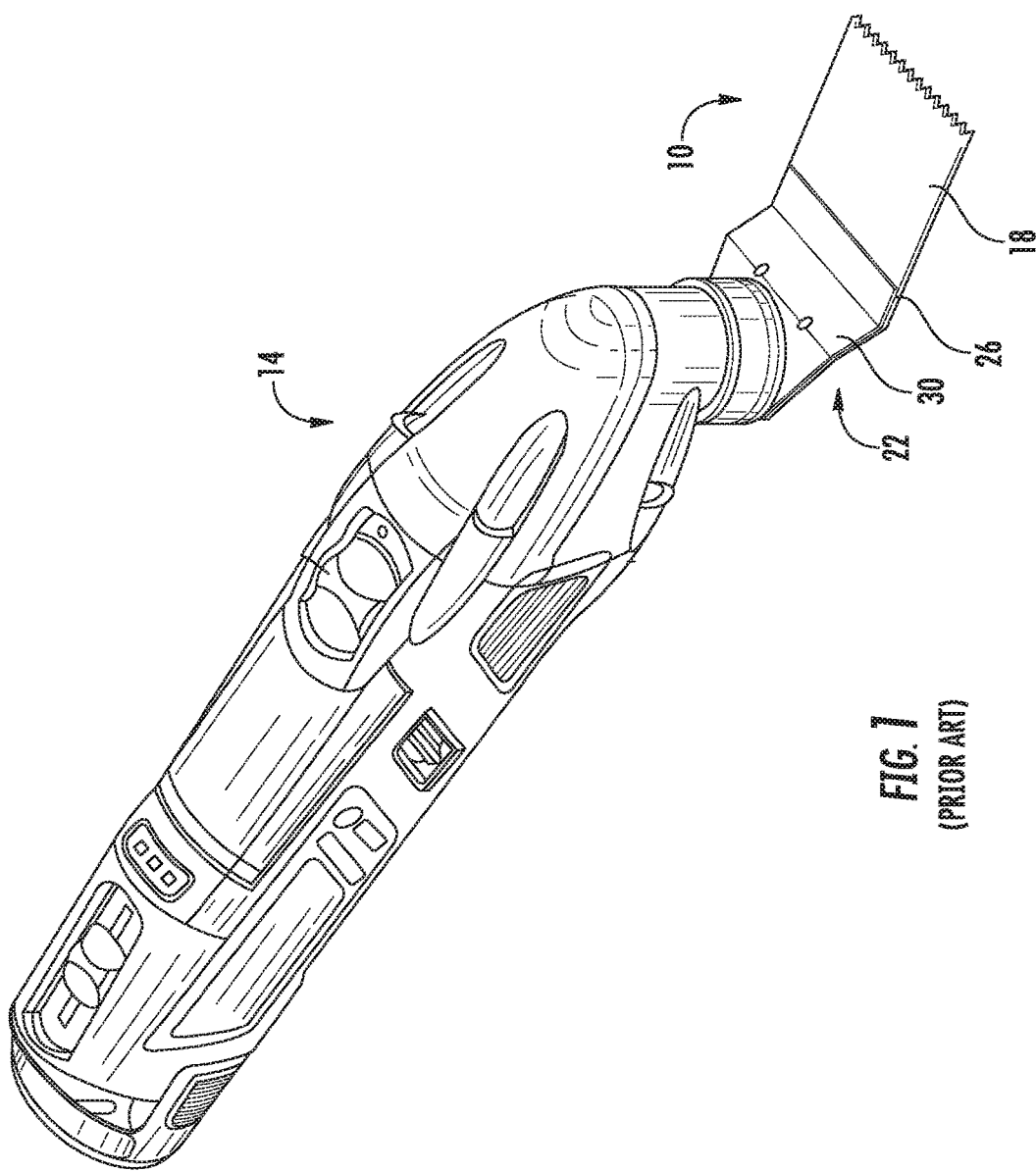
FIG. 1. is a perspective view of a prior art oscillating tool including a saw blade accessory.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 2:
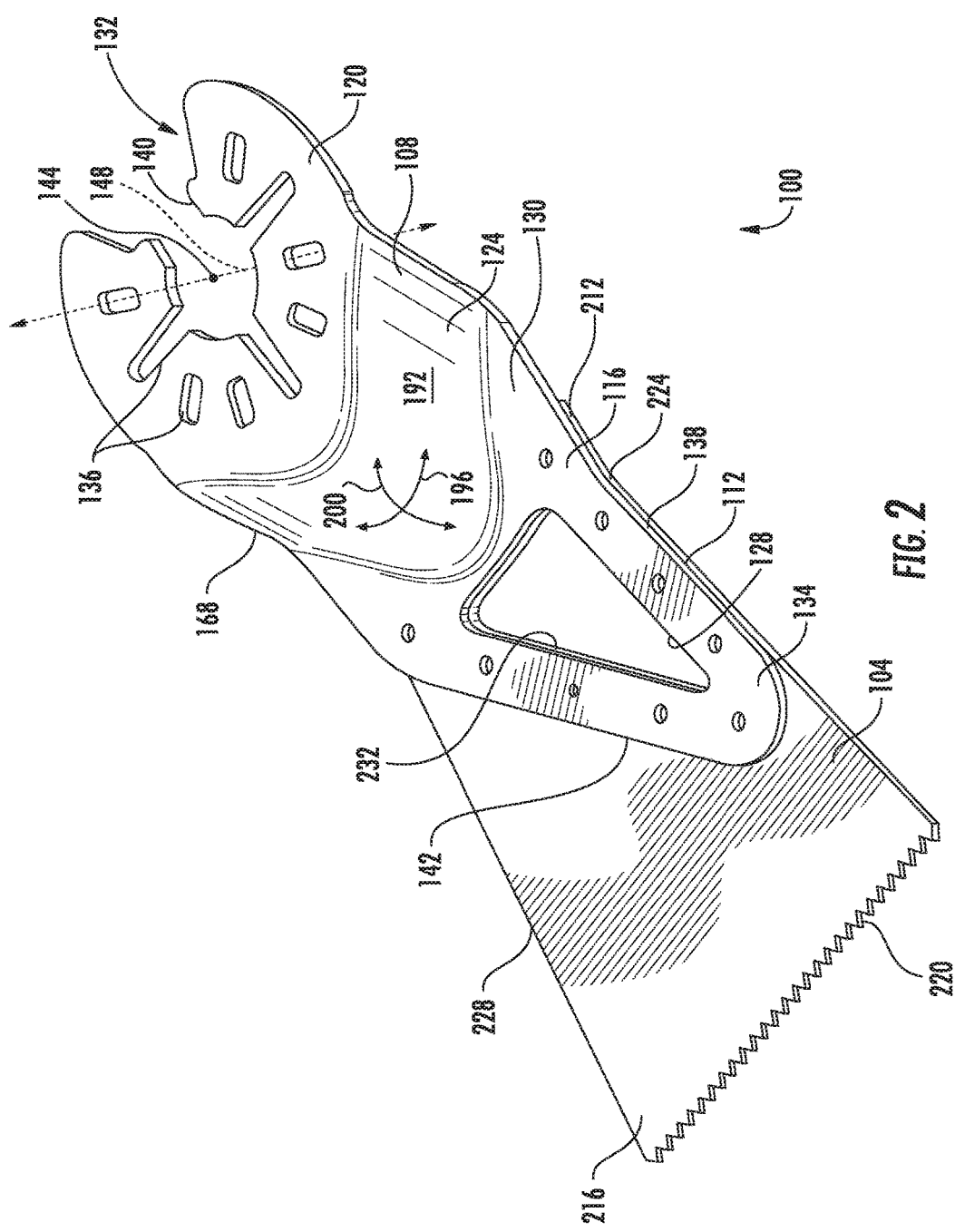
FIG. 2 is a top perspective view of a saw blade accessory according to one embodiment of the present disclosure for use with an oscillating tool, such as depicted in FIG. 1.
Figure 3:
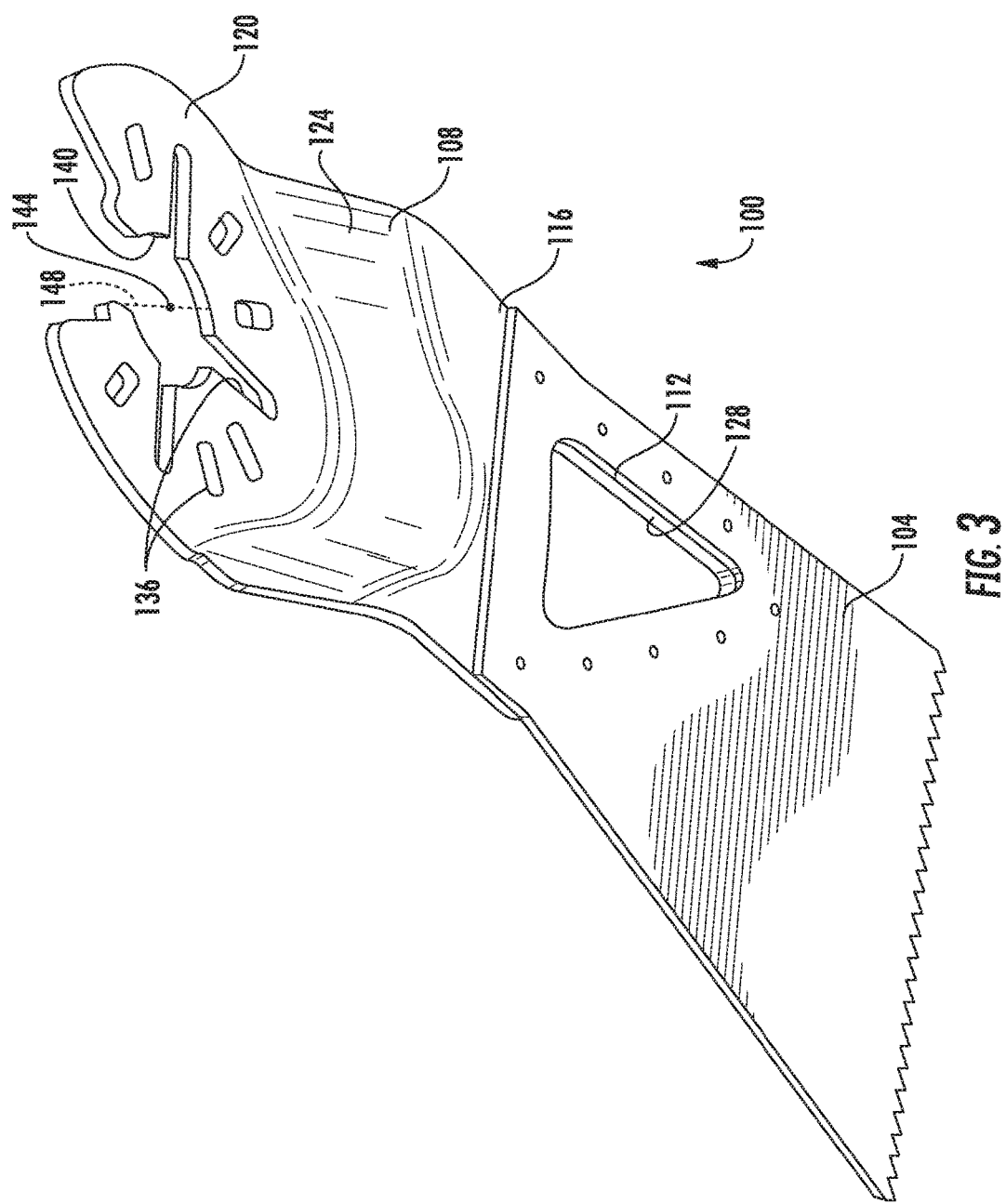
FIG. 3 is a bottom perspective view of the saw blade accessory of FIG. 2.

Referring to FIGS. 2 and 3, the present disclosure is directed to an accessory 100 for use with an oscillating power tool, such as, for example, the oscillating power tool 14 of the prior art. The accessory 100 has increased torsional and bending stiffness relative to the saw blade accessory 10 of the prior art while maintaining a lightweight and compact configuration. The accessory 100 includes a blade 104 and a coupling 108. The blade 104 is fixedly coupled to the coupling 108 at contact area 112, and the coupling 108 is configured to be removably coupled to the power tool such that the power tool can drive the accessory 100 in a known manner to cut a workpiece.

More specifically, the coupling 108 includes a blade portion 116, a tool portion 120, and a transition 124. The blade portion 116 includes the contact area 112, where the coupling 108 is fixedly coupled to the blade 104, and an opening 128. The opening 128 is formed through the coupling 108 to reduce the amount of material required to form the coupling 108 while retaining mechanical strength and stiffness of the blade portion 116 of the coupling 108. In the embodiment shown, the opening 128 is generally triangularly shaped. In other embodiments, however, the opening 128 can have any shape which reduces the amount of material required to form the coupling 108 while retaining mechanical strength and stiffness of the blade portion 116.

In the embodiment shown, the blade portion 116 is affixed to the blade 108 in the contact area 112 by welding. In other embodiments, however, the blade portion 116 can be affixed to the blade 108 using adhesive, rivets, screws, or any other mechanism which securely affixes the blade portion 116 to the blade 108. In the embodiment shown, the contact area 112 substantially surrounds the opening 128 formed in the blade portion 116 and is shaped generally as an acute angle. In other embodiments, however, the contact area 112 can have a different shape which is configured to securely affix the blade portion 116 to the blade 108. In embodiments where the opening 128 has a different shape, the contact area 112 may also have a different shape, which may or may not correspond to the shape of the opening 128.

Figure 4:
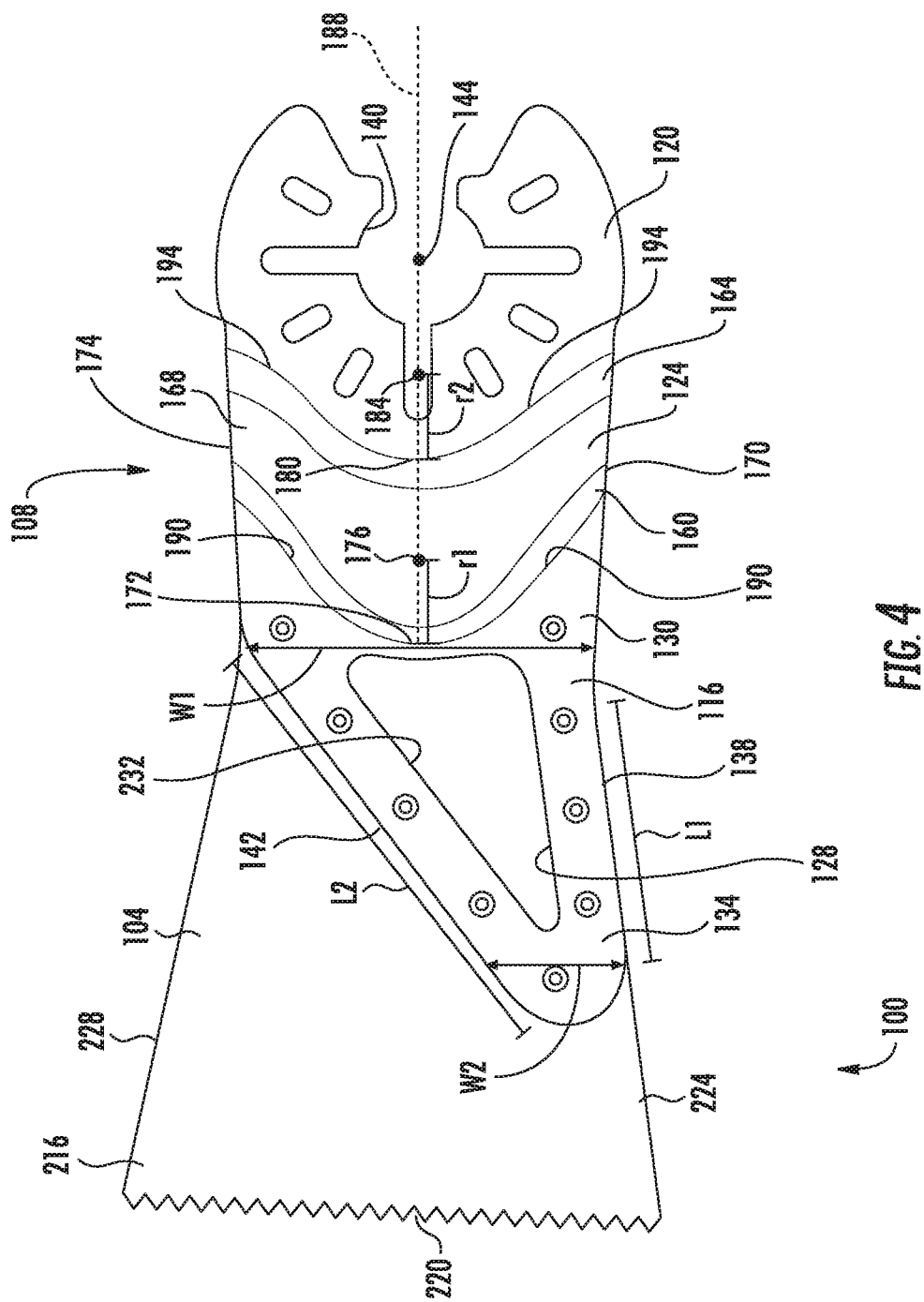
FIG. 4 is a top plan view of the saw blade accessory of FIG. 2.

As shown in FIG. 2, the blade portion 116 has a first blade portion end 130 that is adjacent to the transition 124 and a second blade portion end 134 that is opposite the first blade portion end 130 and is spaced apart from the transition 124. As shown in FIG. 4, the first blade portion end 130 has a first width W1, and the second blade portion end 134 has a second width W2. The first width W1 is larger than the second width W2. In the embodiment shown, the blade portion 116 tapers from the first blade portion end 130 to the second blade portion end 134 such that the blade portion 116 is generally triangularly shaped. As described below, the shape of the blade portion 116 provides the blade 104 with a specific amount of stiffness and allows a specific amount of vibration when the blade 104 is coupled to the coupling 108. In other embodiments, the blade portion 116 can have another shape which provides the blade 104 with a specific amount of stiffness and allows a specific amount of vibration when the blade 104 is coupled to the coupling 108.

In particular, in the embodiment shown, the blade portion 116 is shaped as a scalene triangle. In other words, the blade portion 116 does not taper evenly from the first blade portion end 130 to the second blade portion end 134, but has an irregular shape. Accordingly, the blade portion 116 has a first blade portion side 138 extending from the first blade portion end 130 to the second blade portion end 134 and a second blade portion side 142 extending from the first blade portion end 130 to the second blade portion end 134. The first blade portion side 138 has a length L1 that is shorter than a length L2 of the second blade portion side 142. Furthermore, neither the length L1 of the first blade portion side 138 nor the length L2 of the second blade portion side 142 is equal to the width W1 of the first blade portion end 130. As described below, the shape of the blade portion 116 provides the blade 104 with a specific amount of stiffness and allows a specific amount of vibration when the blade 104 is coupled to the coupling 108. In other embodiments, the blade portion 116 can have another shape which provides the blade 104 with a specific amount of stiffness and allows a specific amount of vibration when the blade 104 is coupled to the coupling 108.

Returning to FIGS. 2 and 3, the tool portion 120 of the coupling 108 is configured to removably couple the accessory 100 to the power tool. To this end, the tool portion 120 includes a mechanical keying 132 configured to matingly engage with a corresponding mechanical keying (not shown) on the power tool in a known manner. In the embodiment shown, the mechanical keying 132 includes a plurality of openings 136 configured to receive corresponding protrusions (not shown) to matingly engage the tool portion 120 to the power tool. In alternative embodiments, however, the mechanical keying 132 can include protrusions and the power tool can include openings. In additional alternative embodiments, the tool portion 120 and the power tool can include another means of matingly engaging the tool portion 120 to the power tool.

In the embodiment shown, the mechanical keying 132 includes a central opening 140 which has a center 144 that is coincident with an axis of rotation 148 of the accessory 100. In other words, when the accessory 100 is coupled to the power tool, and the power tool drives the accessory in a known manner, the accessory 100 rotates about the axis of rotation 148. The axis of rotation 148 is directly aligned with the center 144 of the central opening 140 of the mechanical keying 132 on the tool portion 120.

The transition 124 of the coupling 108 extends between the blade portion 116 and the tool portion 120 to provide a smooth transition of the blade portion 116 into the tool portion 120. As shown in FIG. 5, the blade portion 116 defines a first plane 152, and the tool portion 120 defines a second plane 156 that is parallel to and offset from the first plane 152. The offset between the first plane 152 and the second plane 156 enables the blade 104 to contact a workpiece surface while accommodating the power tool such that the power tool does not contact the workpiece surface. The transition 124 spans the distance between the first plane 152 and the second plane 156. In the embodiment shown, the transition 124 is not perpendicular to the first plane 152 or the second plane 156. However, in alternative embodiments, the transition may be perpendicular to the first plane 152 or the second plane 156.

As shown in FIG. 4, which depicts a top plan view of the coupling 108, the transition 124 includes a first transition region 160, where the transition 124 meets with, or intersects with, the blade portion 116, and a second transition region 164, where the transition meets with, or intersects with, the tool portion 120. The transition 124 further includes a middle portion 168 extending between the first transition region 160 and the second transition region 164. The transition 124 also includes a first transition side 170 that extends from the tool portion 120 to the blade portion 116 and a second transition side 174 that also extends from the tool portion 120 to the blade portion 116 opposite the first transition side 170. In the embodiment shown, the first transition side 170 and the second transition side 174 taper slightly outwardly from the blade portion 116 to the tool portion 120. In alternative embodiments, however, the first transition side 170 and the second transition side 174 can taper to a greater or lesser extent than shown, and can taper in the opposite direction or not at all. The first transition side 170 meets with the first blade portion side 138 at the first transition region 160, and the second transition side 174 meets with the second blade portion side 142 at the first transition region 160.

The first transition region 160 includes a first arc 172 that is formed in the first plane 152 (shown in FIG. 5). The first arc 172 has a center 176 that is arranged between the first arc 172 and the central opening 140 in the tool portion 120. In other words, the first arc 172 is concave toward the tool portion 120 and convex toward the blade portion 116. Similarly, the second transition region 164 includes a second arc 180 that is formed in the second plane 156 (shown in FIG. 5). The second arc 180 has a center 184 that is arranged between the second arc 180 and the central opening 140 in the tool portion 120. In other words, like the first arc 172, the second arc 180 is concave toward the tool portion 120 and convex toward the blade portion 116. The first and second arcs 172, 180 of the transition 124 are configured to distribute stresses on the transition 124 of the coupling 108 during a cutting operation.

In the embodiment shown, the center 176 of the first arc 172, the center 184 of the second arc 180, and the center 144 of the central opening 140 are aligned with each other to form an imaginary straight line 188 when projected onto a plane parallel with either the first plane 152 or the second plane 156 (shown in FIG. 5) or a plane parallel to the first plane 152 and the second plane 156. The line 188 extends in a direction perpendicular to the axis of rotation 148 (shown in FIGS. 2 and 3) of the accessory 100. In alternative embodiments, however, the center 176, center 184, and center 144 need not be aligned with each other.

In the embodiment shown, the center 176 of the first arc 172 and the center 184 of the second arc 180 are arranged such that the tool portion 120 and the transition 124 are symmetrical on either side of the imaginary straight line 188. In alternative embodiments, however, the tool portion 120 and the transition 124 need not be symmetrical on either side of the imaginary straight line 188.

In the embodiment shown, the first arc 172 and the second arc 180 have approximately the same curvature. In other words, a radius r1 between the first arc 172 and its center 176 and a radius r2 between the second arc 180 and its center 184 are approximately equal. In alternative embodiments, however, the first arc 172 and the second arc 180 need not have approximately the same curvature, and the radius r1 need not be approximately equal to the radius r2.

The first transition region 160 further includes at least one first curved portion 190 extending from the first arc 172 to at least one of the first transition side 170 and the second transition side 174. The at least one first curved portion 190 has a center (not shown) which is not coincident with the center 176 of the first arc 172. In other words, the first arc 172 does not extend all the way along the first transition region 160 from the first transition side 170 to the second transition side 174. Instead, at least a portion of the first transition region 160 has a different curvature than the first arc 172. In the embodiment shown, the first transition region 160 includes two symmetrical first curved portions 190, each having its own center, on opposite sides of the first arc 172. One of the first curved portions 190 extends from the first arc 172 to the first transition side 170 and the other of the first curved portions 190 extends from the first arc 172 to the second transition side 174. In alternative embodiments, the first transition region 160 can include more or fewer than two first curved portions 190, and the curved portions 190 can be symmetrical or asymmetrical on either side of the first arc 172.

Similarly, the second transition region 164 includes at least one second curved portion 194 extending from the second arc 180 to at least one of the first transition side 170 and the second transition side 174. The at least one second curved portion 194 has a center (not shown) which is not coincident with the center 184 of the second arc 180. In other words, the second arc 180 does not extend all the way along the second transition region 164 from the first transition side 170 to the second transition side 174. Instead, at least a portion of the second transition region 164 has a different curvature than the second arc 180. In the embodiment shown, the second transition region 164 includes two symmetrical second curved portions 194, each having its own center, on opposite sides of the second arc 180. One of the second curved portions 194 extends from the second arc 180 to the first transition side 170 and the other of the second curved portions 194 extends from the second arc 180 to the second transition side 174. In alternative embodiments, the second transition region 164 can include more or fewer than two second curved portions 194, and the curved portions 194 can be symmetrical or asymmetrical on either side of the second arc 180.

The first and second curved portions 190, 194 are configured to provide smooth boundaries where the first and second transition regions 160, 164 meet the first and second transition sides 170, 174. An abrupt cut off of a regular arc shape concentrates stresses on the transition 124 at the boundaries. Accordingly, the first and second curved portions 190, 194 help further distribute stresses on the transition 124 of the coupling 108 during a cutting operation.

Returning to FIGS. 2 and 3, the middle portion 168 of the transition 124 extends between the first transition region 160 and the second transition region 164, and thus between the first plane 152 and the second plane 156. Accordingly, the middle portion 168 is partially shaped by the first and second arcs 172, 180 and by the first and second curved portions 190, 194. The middle portion 168 defines a surface 192 between the first transition region 160 and the second transition region 164 that is not parallel to the first plane 152 or the second plane 156. Furthermore, the middle portion 168 defines a surface 192 that is not planar. The surface 192 of the middle portion 168 is curved in more than one direction. In other words, the middle portion 168 is at least partially dome shaped. The at least partial dome shape of the middle portion 168 distributes stresses on the transition 124 of the coupling 108 during a cutting operation.

More specifically, the middle portion 168 curves in a direction (shown by arrow 196) about the axis of rotation 148 of the accessory 100. Additionally, the middle portion 168 curves in a direction (shown by arrow 200) perpendicular to the axis of rotation 148 of the accessory 100. In the embodiment shown, the middle portion 168 is not shaped as a regular dome. In other words, the curvature of the surface 192 in the direction 196 and the direction 200 is not consistent or regular over the entire surface 192. In alternative embodiments, the surface 192 of the middle portion 168 can have a different curvature which is shaped to distribute stresses on the transition 124 of the coupling 108 during a cutting operation Turning now to FIG. 6, the blade 104 is shown without the coupling 108. The blade 104 includes a bottom surface 204 configured to rest on a workpiece to cut the workpiece when the accessory 100 is driven by an oscillating power tool in a known manner. The blade 104 also includes a top surface 208, opposite the bottom surface 204, and configured to be coupled to the coupling 108 at the contact area 112 (shown in FIGS. 2 and 3). The blade 104 further includes a first blade end 212 that is arranged nearest to the transition 124 of the coupling 108 when the blade 104 is coupled to the coupling 108. Additionally, the blade 104 includes a second blade end 216, opposite the first blade end 212, which is arranged farthest from the transition 124 of the coupling 108 when the blade 104 is coupled to the coupling 108. The first blade end 212 is coupled to the coupling 108, but the second blade end 216 is not coupled to the coupling 108. The second blade end 216 includes the cutting edge 220 of the blade 104. In the embodiment shown, the cutting edge 220 is a serrated edge. In alternative embodiments, however, the cutting edge 220 can be a different type of sharpened edge configured to make a cut in a workpiece.

The blade 104 has a first blade side 224, which extends from the first blade end 212 to the second blade end 216, and a second blade side 228, opposite the first blade side 224, which also extends from the first blade end 212 to the second blade end 216. In the embodiment shown, the first blade side 224 and the second blade side 228 are symmetrical to one another such that the blade 104 is symmetrical. In alternative embodiments, however, the first blade side 224 and the second blade side 228 need not be symmetrical to one another, and the blade 104 need not be symmetrical.

The blade 104 has a first blade width W3 extending from the first blade side 224 to the second blade side 228 at the first blade end 212. The blade 104 also has a second blade width W4 extending from the first blade side 224 to the second blade side 228 at the second blade end 216. In the embodiment shown, the second blade width W4 is greater than the first blade width W3. In other words, the blade 104 tapers inwardly from the second blade end 216 toward the first blade end 212. In alternative embodiments, however, the blade 104 may taper to a greater or lesser extent than is shown, may taper in the opposite direction, or may not taper at all. The blade 104 also has opening 232 that is shaped and sized the same as the opening 128 in the blade portion 116 of the coupling (shown in FIGS. 2 and 3).

As shown in FIG. 4, when the blade 104 is coupled to the coupling 108, the opening 232 of the blade 104 is aligned with the opening 128 in the coupling 108, and the first blade portion side 138 is aligned with the first blade side 224. The top plan view of the accessory 100 shown in FIG. 4 shows a view of the accessory along the axis of rotation 148 (shown in FIGS. 2 and 3). Accordingly, FIG. 4 illustrates that the first blade portion side 138 is aligned with the first blade side 224 in a direction parallel to the axis of rotation 148. The alignment of the first blade portion side 138 and the first blade side 224 strengthens the interface between the blade 104 and the coupling 108 at the contact area 112 to increase torsional and bending stiffness of the accessory 100 at the contact area 112.

The first blade portion width W1 (shown in FIG. 4) is approximately equal to the first blade width W3 (shown in FIG. 6). Accordingly, when the blade 104 is coupled to the coupling 108, the first blade end 212 is aligned with the first blade portion end 130. The alignment of the first blade end 212 with the first blade portion end 130 also strengthens the interface between the blade 104 and the coupling 108 at the contact area 112 to increase torsional and bending stiffness of the accessory 100 at the contact area 112.

When the coupling 108 is coupled to the blade 104, the coupling 108 does not extend along the entire length of the blade 104. In other words, the contact area 112 does not extend to the second blade end 216. Additionally, because the blade portion 116 is formed as a scalene triangle while the blade 104 is symmetrically shaped, the second blade portion side 142 does not align with the second blade side 228 when the coupling 108 is coupled to the blade 104. The extension of the blade 104 beyond the coupling 108 facilitates the cutting operation by providing the cutting edge 220 on the second blade end 216 with a specific amount of stiffness and allowing a specific amount of vibration.

The features of the accessory 100 described herein reduces stress concentrations in the coupling 108, provide increased torsional and bending stiffness of the accessory 100 at the contact area 112, and provide a specific amount of stiffness at the cutting edge 220. Accordingly, the features of the accessory 100 enable a user performing a cutting operation with the accessory 100 coupled to an oscillating power tool to make more accurate and straighter cuts than saw blades of the prior art.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. An accessory for a power tool, comprising:
    an axis of rotation about which the accessory is configured to rotate;
    a blade; and
    a coupling, including:
        a blade portion fixedly coupled to the blade;
        a tool portion configured to be removably coupled to the power tool, the tool portion including an opening arranged about the axis of rotation; and
        a transition extending between the blade portion and the tool portion, the transition including a first transition region where the transition intersects with the blade portion, the transition including a second transition region where the transition intersects with the tool portion,
        wherein the first transition region includes a first arc having a center that is arranged between the first arc and the axis of rotation, and
        wherein the second transition region includes a second arc having a center that is arranged between the second arc and the axis of rotation.

2. The accessory as claimed in claim 1, wherein a radius of the first arc is approximately equal to a radius of the second arc.

3. The accessory as claimed in claim 1, wherein:
    the blade portion defines a first plane, and
    the tool portion defines a second plane.

4. The accessory as claimed in claim 3, wherein the first arc is in the first plane.

5. The accessory as claimed in claim 3, wherein the second arc is in the second plane.

6. The accessory as claimed in claim 3, wherein the transition further includes a middle portion extending between the first transition region and the second transition region.

7. The accessory as claimed in claim 6, wherein the middle portion defines a surface which is not parallel to the first plane or the second plane.

8. The accessory as claimed in claim 7, wherein the surface is not planar.

9. The accessory as claimed in claim 7, wherein the surface is at least partially dome shaped.

10. The accessory as claimed in claim 7, wherein:
    the surface is at least partially curved about an axis that is parallel to the axis of rotation.

11. The accessory as claimed in claim 7, wherein:
    the surface is at least partially curved about an axis that is perpendicular to the axis of rotation.

12. The accessory as claimed in claim 11, wherein:
    the surface is at least partially curved about an axis that is parallel to the axis of rotation.

13. The accessory as claimed in claim 1, wherein:
    the blade portion has a first blade portion end that is adjacent to the transition and a second blade portion end that is opposite the first blade portion end and is not adjacent to the transition; and
    the first blade portion end has a first blade portion width and the second blade portion end has a second blade portion width that is different than the first blade portion width.

14. The accessory as claimed in claim 13, wherein:
    the blade has a first blade end that is coupled to the coupling and a second blade end that is opposite the first blade end and is not coupled to the coupling; and
    the first blade end has a first blade width and the second blade end has a second blade width that is different than the first blade width.

15. The accessory as claimed in claim 14, wherein the first blade width is approximately equal to the first blade portion width.

16. The accessory as claimed in claim 14, wherein:
the blade portion has a first blade portion side extending from the first blade portion end to the second blade portion end;
the blade has a first blade side extending from the first blade end to the second blade end; and
the first blade portion side is aligned with the first blade side.

17. The accessory as claimed in claim 16, wherein:
the first blade portion side is aligned with the first blade side in a direction parallel to the axis of rotation.

18. An accessory for a power tool, comprising:
an axis of rotation about which the accessory is configured to rotate;
a blade; and
a coupling, including:
   a blade portion fixedly coupled to the blade;
   a tool portion configured to be removably coupled to the power tool, the tool portion including an opening arranged about the axis of rotation; and
   a transition extending between the blade portion and the tool portion, the transition including a first transition region where the transition intersects with the blade portion, the transition including a second transition region where the transition intersects with the tool portion, wherein:
the first transition region includes a first arc having a center that is arranged between the first arc and the axis of rotation,
the second transition region includes a second arc having a center that is arranged between the second arc and the axis of rotation,
the blade portion has a first blade portion end that is adjacent to the transition and a second blade portion end that is opposite the first blade portion end and is not adjacent to the transition,
the first blade portion end has a first blade portion width and the second blade portion end has a second blade portion width that is different than the first blade portion width, and
the second blade portion width is smaller than the first blade portion width.

19. An accessory for a power tool, comprising:
an axis of rotation about which the accessory is configured to rotate;
a blade; and
a coupling, including:
   a blade portion fixedly coupled to the blade;
   a tool portion configured to be removably coupled to the power tool, the tool portion including an opening arranged about the axis of rotation; and
   a transition extending between the blade portion and the tool portion, the transition including a first transition region where the transition intersects with the blade portion, the transition including a second transition region where the transition intersects with the tool portion, wherein:
the first transition region includes a first arc having a center that is arranged between the first arc and the axis of rotation,
the second transition region includes a second arc having a center that is arranged between the second arc and the axis of rotation,
the transition has a first transition side that extends from the tool portion to the blade portion and a second transition side that is opposite the first transition side and extends from the tool portion to the blade portion,
the first transition region further includes at least one first curved portion extending from the first arc to one of the first transition side and the second transition side, and
the at least one first curved portion has a different center than the first arc.

20. The accessory as claimed in claim 19, wherein:
the second transition region further includes at least one second curved portion extending from the second arc to one of the first transition side and the second transition side; and
the at least one second curved portion has a different center than the second arc.

* * * * *